United States Patent
Lee (10) Patent No.: US 8,028,832 B2
(45) Date of Patent: Oct. 4, 2011

(54) STORAGE DEVICE

(75) Inventor: Seung Sup Lee, Edgewater, NJ (US)

(73) Assignee: BBP Industries, LLC, West New York, NJ (US)

( * ) Notice: Subject to any disclaimer, the term of this patent is extended or adjusted under 35 U.S.C. 154(b) by 40 days.

(21) Appl. No.: 12/355,788

(22) Filed: Jan. 18, 2009

(65) Prior Publication Data

US 2009/0184014 A1 Jul. 23, 2009

Related U.S. Application Data

(60) Provisional application No. 61/036,190, filed on Mar. 13, 2008, provisional application No. 61/022,327, filed on Jan. 19, 2008.

(51) Int. Cl.
*B65D 85/38* (2006.01)
(52) U.S. Cl. ........................ 206/320; 150/127
(58) Field of Classification Search .............. 206/305, 206/320; 150/127–130; 190/124–127, 119, 190/109; 383/100, 102, 103, 105, 114, 117
See application file for complete search history.

(56) References Cited

U.S. PATENT DOCUMENTS

| | | | | |
|---|---|---|---|---|
| 1,819,913 A * | 8/1931 | Miller et al. | ................... | 383/110 |
| 1,938,519 A * | 12/1933 | Deffenbaugh | ................ | 220/503 |
| 2,121,154 A * | 6/1938 | Landis | ........................... | 150/127 |
| 2,218,666 A * | 10/1940 | Tamoschat | .................... | 150/119 |
| 2,238,213 A * | 4/1941 | Demerer | ...................... | 150/117 |
| 2,288,996 A * | 7/1942 | Dubilier | ......................... | 150/150 |
| 2,508,825 A * | 5/1950 | Lewis | ........................... | 150/110 |
| 2,745,593 A * | 5/1956 | Brady | .............................. | 383/14 |
| 3,081,807 A * | 3/1963 | Lightburn | ...................... | 206/320 |
| 4,513,907 A * | 4/1985 | Grosshuesch | ................. | 229/120 |
| 4,921,103 A * | 5/1990 | Cohen | ........................... | 206/523 |
| 5,474,163 A * | 12/1995 | West et al. | .................... | 190/102 |
| 5,706,940 A * | 1/1998 | Amarello | ...................... | 206/320 |
| 6,120,817 A * | 9/2000 | Archibald et al. | ............ | 426/106 |
| 6,726,362 B1 * | 4/2004 | Frisch et al. | .................. | 383/103 |
| 6,745,897 B2 * | 6/2004 | Barber et al. | ................. | 206/320 |
| 6,763,942 B1 * | 7/2004 | Yeh | ................. | 206/320 |
| 7,252,183 B2 * | 8/2007 | Christie | ........................ | 190/102 |
| 2002/0067866 A1 * | 6/2002 | Moor et al. | ..................... | 383/40 |
| 2004/0011616 A1 * | 1/2004 | Rasmussen | .................... | 190/107 |

(Continued)

OTHER PUBLICATIONS

Civilian Lab LLC, "Radiator Macbook Case," http://www.civilianlab.com/ (last accessed Jan. 7, 2009).

(Continued)

*Primary Examiner* — J. Gregory Pickett
*Assistant Examiner* — King M Chu
(74) *Attorney, Agent, or Firm* — Stamoulis & Weinblatt LLC (57) ABSTRACT

A storage device and a method for making the storage device are described. In one implementation, the storage device comprises first and second walls having interior and exterior portions. The second wall opposes and is connected to the first wall so that the interior portions of the first and second walls define an interior of the storage device and the exterior portions of the first and second walls define an exterior of the storage device. An access opening is located between the first and second walls, and the access opening is sized to receive an electronic device. A plurality of voids is located in the first wall and the voids are configured to permit air passage between the interior and exterior of the storage device. A porous material that permits airflow through the voids may be connected to the first wall. Other implementations are described.

20 Claims, 7 Drawing Sheets

U.S. PATENT DOCUMENTS

| | | | |
|---|---|---|---|
| 2004/0144821 A1* | 7/2004 | Gelphman | 224/610 |
| 2004/0228548 A1* | 11/2004 | Arnell | 383/63 |
| 2005/0029065 A1* | 2/2005 | Christie | 190/102 |
| 2007/0119734 A1* | 5/2007 | Pichahchi | 206/320 |
| 2007/0189642 A1* | 8/2007 | Materna | 383/100 |
| 2007/0248291 A1* | 10/2007 | Reeves et al. | 383/102 |
| 2007/0251846 A1* | 11/2007 | Brim, III | 206/320 |
| 2008/0128318 A1* | 6/2008 | Kokinda | 206/701 |
| 2009/0038900 A1* | 2/2009 | Redzisz et al. | 190/108 |
| 2009/0078707 A1* | 3/2009 | Chen | 220/592.01 |

OTHER PUBLICATIONS

Civilian Lab LLC, "Heat Control System," http://www.civilianlab.com/ (last accessed Jan. 7, 2009).

Civilian Lab LLC, "Radiator," http://www.civilianlab.com/Radiator_/Interior_Open_Big.jpg (last accessed Jan. 7, 2009).

Incase, "13 Neoprene Sleeve," http://goincase.com/products/detail/13-neoprene-sleeve-cl57098/1 (last accessed Jan. 7, 2009).

Incase, "13 Neoprene Sleeve," http://goincase.com/products/deltail/13-neoprene-sleeve-cl57098/2 (last accessed Jan. 7, 2009).

\* cited by examiner

STORAGE DEVICE

CROSS-REFERENCE TO RELATED APPLICATIONS

This application claims the benefit of U.S. Provisional Patent Application No. 61/022,327, filed Jan. 19, 2008 and U.S. Provisional Patent Application No. 61/036,190, filed Mar. 13, 2008, the entire disclosures of which are incorporated herein by reference.

TECHNICAL FIELD

This application relates in general to storage devices.

BACKGROUND

Electronic devices, including, but not limited to, notebook computers and tablet computers, are often stored in cases when not being actively used. Similarly, electronic devices generally are transported in cases when the owners or users of the electronic devices need to transport the electronic devices. Cases typically do not permit airflow between the compartments where the electronic devices are stored and the air outside of the cases when the cases are closed.

When electronic devices are powered by batteries, the batteries may become warm or hot when the electronic device is being used. Users of battery powered electronic devices generally "shut down" or turn the power off of the electronic devices and then put them in cases before the temperature of the batteries decreased. When this happens, the heat from the batteries may be trapped within the cases. When a battery including, but not limited to, a rechargeable battery, is not in use and is or becomes warm or hot, the battery's capacity, number of recharge cycles, and general lifespan may decrease.

There is thus a need for a storage device that allows airflow from outside of the storage device to the area in which the electronic device's battery is located.

SUMMARY

This application describes a storage device and a method for making the storage device.

In accordance with one implementation, a storage device is configured to receive an electronic device. The storage device comprises a first wall having an interior and exterior portion and a second wall having an interior and exterior portion. The second wall opposes and is connected to the first wall so that the interior portions of the first and second walls define an interior of the storage device and the exterior portions of the first and second walls define an exterior of the storage device. An access opening is located between the first and second walls, and the access opening is sized to receive the electronic device. A plurality of voids is located in the first wall and the voids are configured to permit air passage between the interior and exterior of the storage device. A porous material that permits airflow through the voids is connected to the first wall.

In accordance with another implementation, a storage device is configured to receive an electronic device. The storage device comprises a first wall having an interior and exterior portion and a second wall having an interior and exterior portion. The second wall opposes and is connected to the first wall so that the interior portions of the first and second walls define an interior of the storage device and the exterior portions of the first and second walls define an exterior of the storage device. An access opening is located between the first and second walls, and the access opening is sized to receive the electronic device. A plurality of voids is located in the first wall and the voids are configured to permit air passage between the interior and exterior of the storage device. A third wall has an interior and exterior portion and voids, and the third wall opposes and is connected to the first wall. The interior of the third wall and the exterior of the first wall define an interior of a compartment, and the voids in the third wall substantially align with the voids in the first wall.

In accordance with yet another implementation, a method for making a storage device configured to receive an electronic device comprises forming a first wall having an interior and exterior portion; forming a second wall having an interior and exterior portion, the second wall opposing and connected to the first wall so that the interior portions of the first and second walls define an interior of the storage device and the exterior portions of the first and second walls define an exterior of the storage device; forming an access opening between the first and second walls, the access opening sized to receive the electronic device; creating a plurality of voids located in the first wall configured to permit air passage between the interior and exterior of the storage device; and connecting to the first wall a porous material that permits airflow through the voids.

In accordance with another implementation, a method for making a storage device configured to receive an electronic device comprises forming a first wall having an interior and exterior portion; forming a second wall having an interior and exterior portion, the second wall opposing and connected to the first wall so that the interior portions of the first and second walls define an interior of the storage device and the exterior portions of the first and second walls define an exterior of the storage device; forming an access opening between the first and second walls, the access opening sized to receive the electronic device; creating a plurality of voids located in the first wall configured to permit air passage between the interior and exterior of the storage device; and forming a third wall having an interior and exterior portion and voids, the third wall opposing and connected to the first wall so that the interior of the third wall and the exterior of the first wall define an interior of a compartment, and the voids in the third wall substantially align with the voids in the first wall.

The details of one or more implementations are set forth in the accompanying drawings and the description below. Other features, aspects, and advantages will become apparent from the description, the drawings, and the claims.

It is to be understood that the foregoing general description and the detailed description are exemplary, but not restrictive of the storage device or the method for making the storage device.

DESCRIPTION OF DRAWINGS

In the drawings, which are discussed below, one or more implementations are illustrated. It is understood that the storage device is not limited to the implementations depicted in the drawings herein, but rather it is defined by the claims appended hereto and equivalent structures.

Like reference symbols in the various drawings indicate like elements.

DETAILED DESCRIPTION

While the specification concludes with claims particularly pointing out and distinctly claiming subject matter, the storage device will now be further described by reference to the following detailed description of exemplary implementations taken in conjunction with the above-described accompanying drawings. The following description is presented to enable any person skilled in the art to make and use the storage device. Descriptions of specific implementations and applications are provided only as non-limiting examples and various modifications will be readily apparent to those skilled in the art. The general principles defined herein may be applied to other implementations and applications without departing from the spirit and scope of the storage device. Thus, the storage device is to be accorded the widest scope encompassing numerous alternatives, modifications, and equivalents consistent with the principles and features disclosed herein. For purpose of clarity, details relating to technical material that is known in the technical fields related to the storage device have not been described in detail so as not to unnecessarily obscure the present application.

Figure 1:
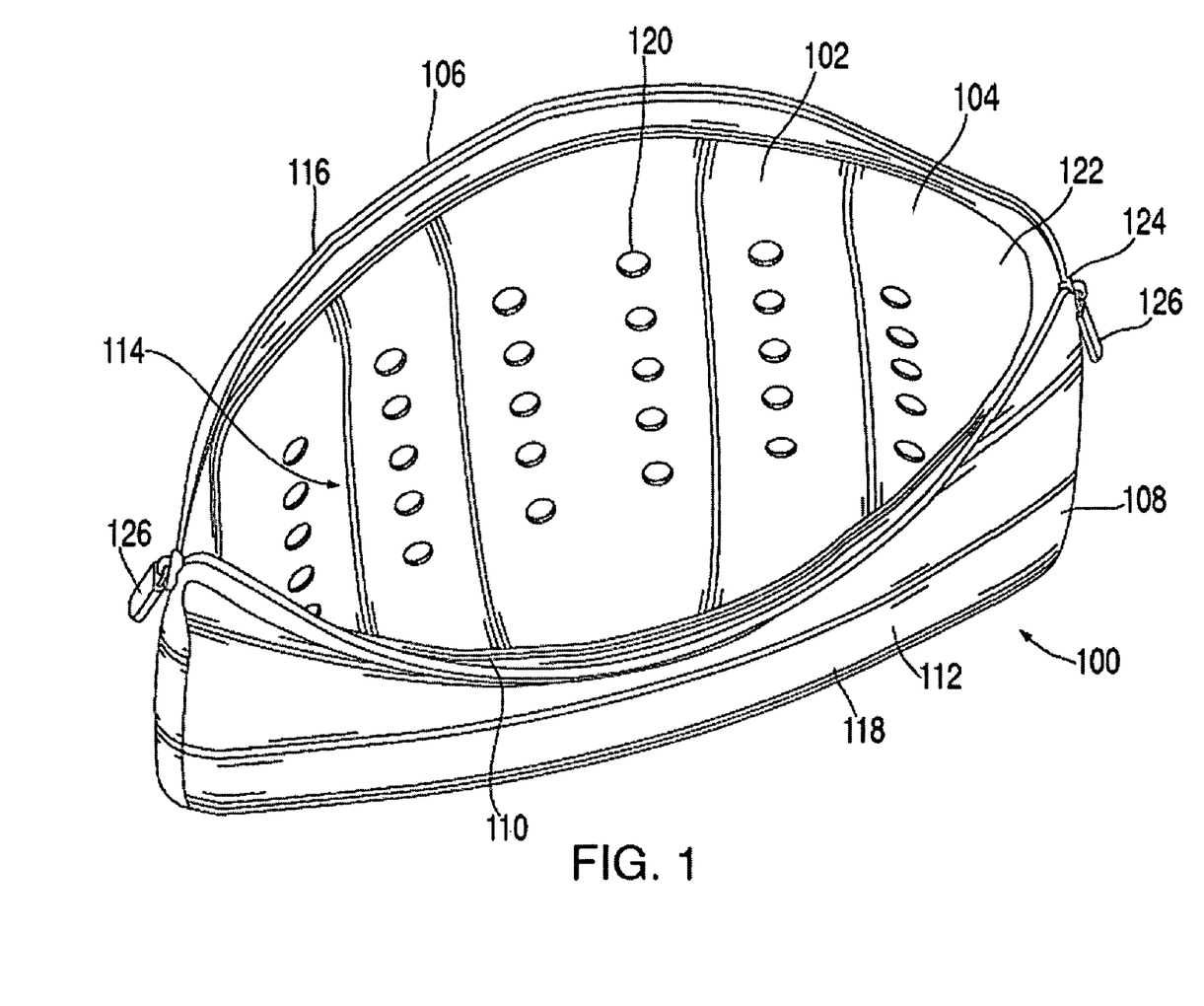
FIG. 1 is a perspective view of an exemplary implementation of the storage device.

As shown in FIG. 1, a storage device 100 has a first wall 102 having an interior and exterior portion 104, 106, and a second wall 108 having an interior and exterior portion 110, 112. The second wall 108 opposes and is connected to the first wall 102 so that the interior portions 104, 110 of the first and second walls 102, 108 define an interior 114 of the storage device 100. The exterior portions 106, 112 of the first and second walls 102, 108 define an exterior 116, 118 of the storage device 100.

A plurality of voids 120 is located in the first wall 102. The voids 120 are sized and configured to permit air passage between the interior 114 and exterior 116 of the storage device 100. In some implementations, the size of the voids 120 is approximately 3 millimeters. In some implementations, the size of the voids 120 is greater than 3 millimeters. In some implementations, the size of the voids 120 is approximately 10-15 millimeters. In some implementations, the size of the voids 120 is approximately 35-45 millimeters. In some implementations, the size of the voids 120 is approximately 40 millimeters. In some implementations, approximately 10%-90% of the first wall 102 contains voids. In some implementations, approximately 10%-20% of the first wall 102 contains voids 120. In some implementations, approximately 13%-16% of the first wall 102 contains voids 120. In some implementations, approximately 15% of the first wall 102 contains voids 120. In some implementations, approximately 35%-50% of the first wall 102 contains voids 120. In some implementations, approximately 40%-49% of the first wall 102 contains voids 120. In some implementations, approximately 41% of the first wall 102 contains voids 120. In some implementations, approximately 45% of the first wall 102 contains voids 120.

The storage device 100 has an access opening 122 located between the first and second walls 102, 108 which is sized to receive an electronic device (not shown in FIG. 1). A mechanism 124 for closing the access opening 122 may be present in the storage device 100. As shown in FIG. 1, the mechanism 124 for closing the access opening 122 is a zipper. The zipper has two pull tabs 126 in FIG. 1. However, in some implementations, the zipper has only one pull tab. In some implementations having a mechanism 124 for closing the access opening 122, the mechanism 124 may be a hook-and-loop fastener, a snap, a button, a buckle, string, laces, an elastic band, a hinge, or any other suitable mechanism for opening and closing the access opening 122.

Figure 2:
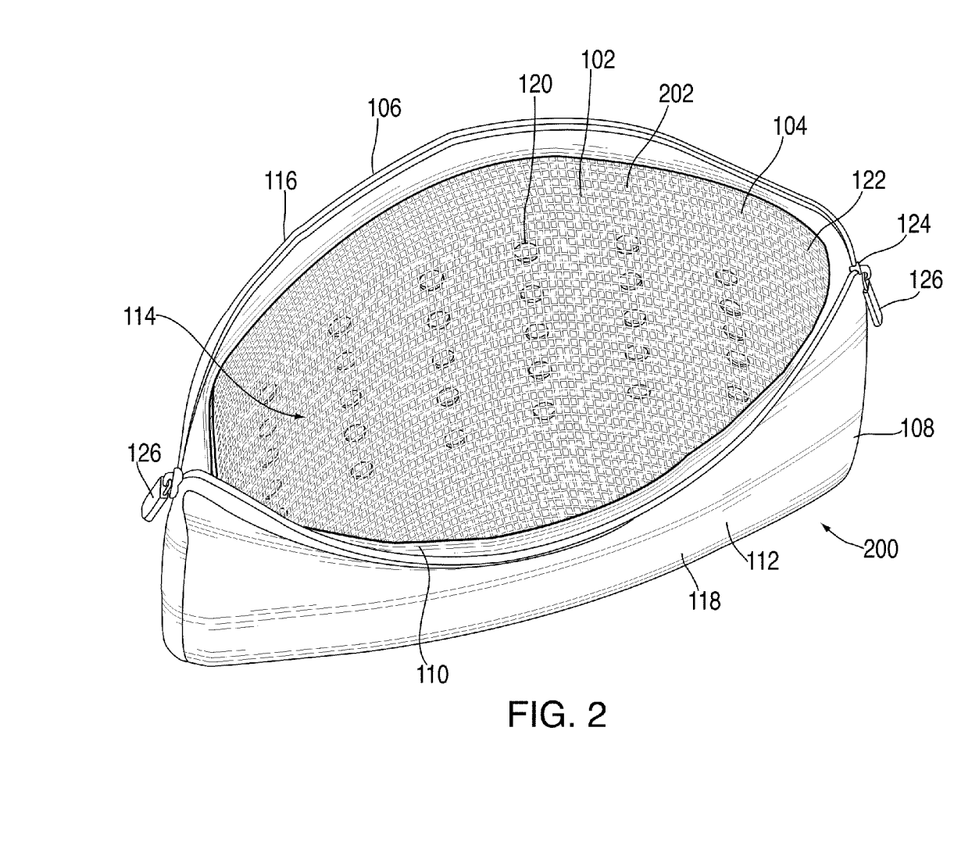
FIG. 2 is a perspective view of an exemplary implementation of the storage device.

FIG. 2 shows a perspective view of another implementation of the storage device. Storage device 200 has a porous material 202 connected to the interior 104 of the first wall 102. In some implementations, in addition to or instead of porous material 202 being connected to the interior 104 of the first wall 102, the porous material 202 is connected to the exterior 106 of first wall 102. The porous material 202 permits airflow through the voids 120 and also may prevent objects from entering the interior 114 of storage device 200 from the exterior 116. As shown in FIG. 2, the porous material 202 is mesh. In some implementations, the porous material 202 may be a nonwoven or woven fabric or a porous mesh of synthetic material. The porous material 202 may be connected to the first wall 102 by stitching, heat seal, zipper, hook-and-loop fastener, a button, or any other suitable mechanism known by one of ordinary skill in the art for connecting the porous material 202 to the first wall.

Figure 3:
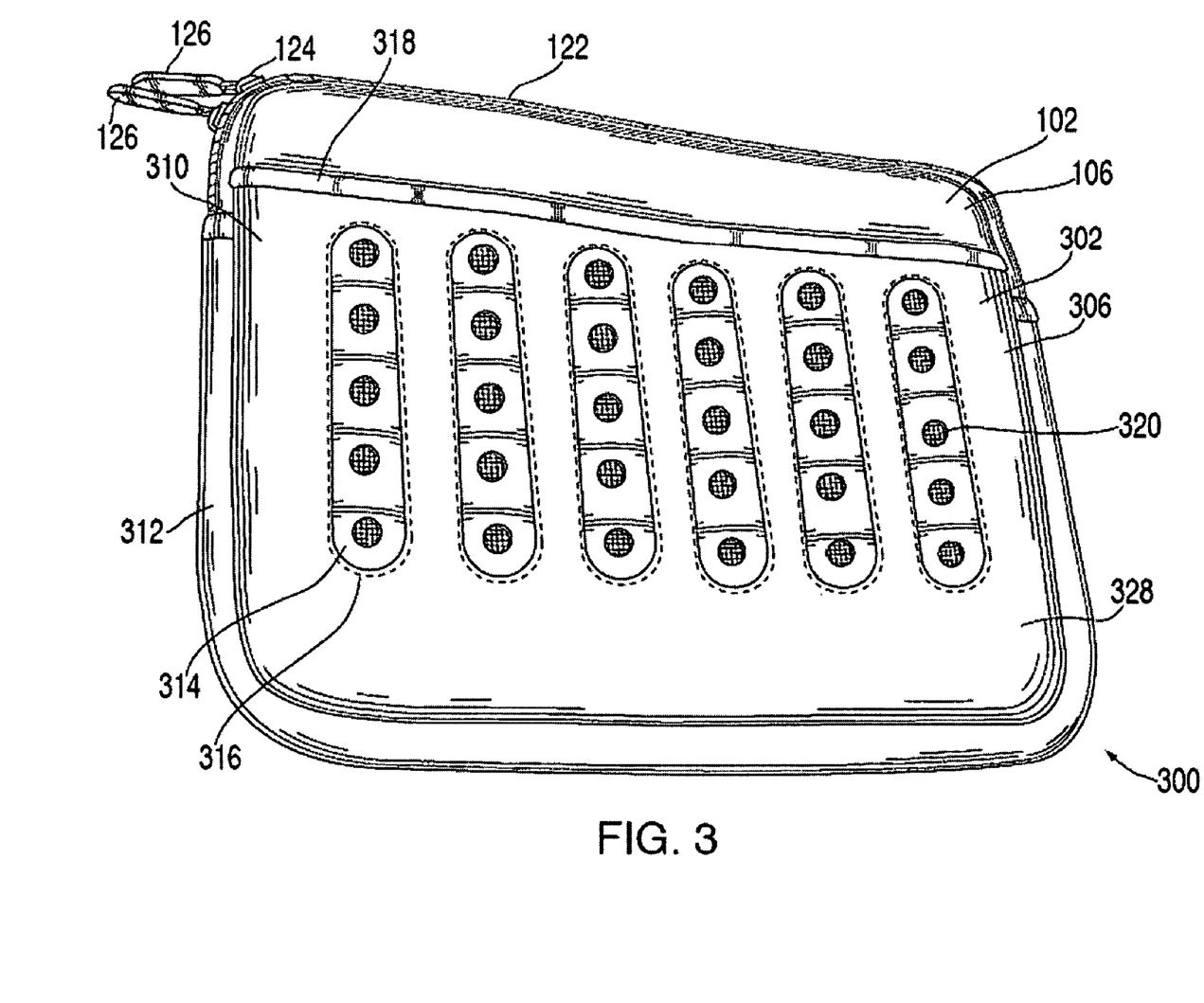
FIG. 3 is a perspective view of an exemplary implementation of the storage device.
Figure 4:
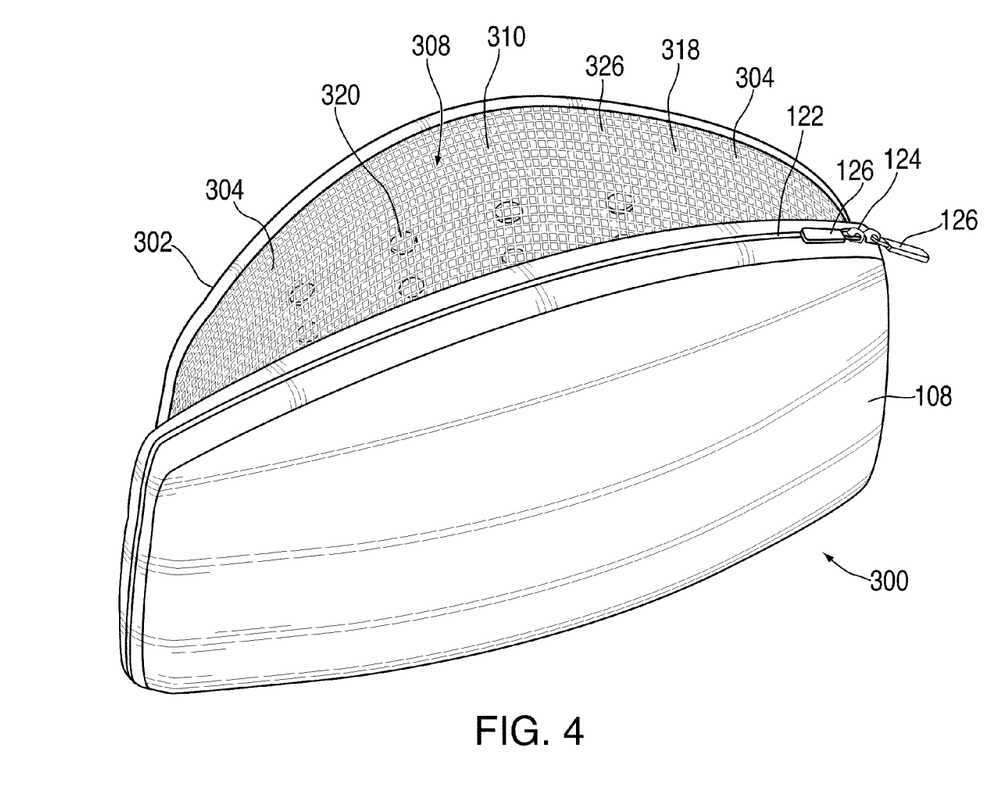
FIG. 4 is a top perspective view of the storage device of FIG. 3.
Figure 5:
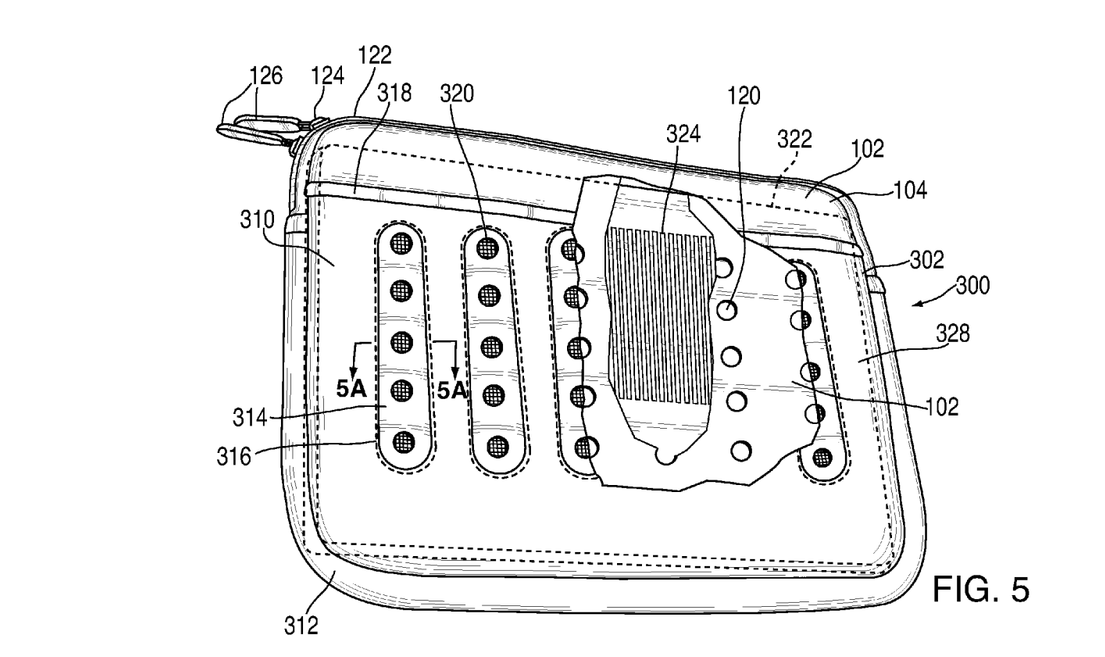
FIG. 5 is a cutaway perspective view of the storage device of FIG. 2 with an electronic device inserted therein.

FIGS. 3-5 show another implementation of the storage device. Storage device 300 has a first wall 102 connected to a second wall 108 via a sidewall 312. A third wall 302 has an interior portion 304 and an exterior portion 306. The third wall 302 opposes and is connected to the first wall 102 so that the interior 304 of the third wall 302 and the exterior 106 of the first wall 102 define an interior 308 of a compartment 310. A plurality of voids 320 is located in the third wall 302. The voids 320 of the third wall 302 substantially align with the voids 120 in the first wall 102. By having the voids 320 substantially aligned with the voids 120 in the first wall 102, air is permitted to pass between the interior 308 and exterior 328 of the storage device 300.

The compartment 310 has an access opening 318 located between the first and third walls 102, 302. In some implementations, a mechanism for closing the access opening 318 of the compartment 310 may be present. The mechanism for closing the access opening 318 may be a zipper, a hook-and-loop fastener, a snap, a button, a buckle, string, laces, an elastic band, a hinge, or any other suitable mechanism for opening and closing the access opening 318. In some implementations, the compartment 310 has a second access opening located between the first and third walls 102, 302. In some implementations, a first access opening may be located at the top of the compartment 310 and a second access opening may be located at the bottom of the compartment 310. In some implementations, a first access opening may be located at a side of the compartment 310 and a second access opening may be located at the opposite side of the compartment 310.

As shown in FIG. 4, a porous material 326 is connected to the interior 304 of the third wall 302. In some implementations, in addition to or instead of the porous material 326 being connected to the interior 304 of third wall 302, the porous material 326 is connected to the exterior 306 of the third wall 302. The porous material 326 permits airflow through the voids 320 and also may prevent objects from entering the interior 308 of the compartment 310 from the exterior 328 of the compartment 310. As shown in FIGS. 3-5, the porous material 326 is mesh. In some implementations, the porous material 326 may be a nonwoven or woven fabric or a porous mesh of synthetic material. The porous material 326 may be connected to the third wall 302 by stitching, heat seal, zipper, hook-and-loop fastener, a button, or any other suitable mechanism known by one of ordinary skill in the art for connecting the porous material 326 to the first wall.

In some implementations, the porous material 326 is not present. In some implementations, as described above with respect to FIG. 2, a porous material is connected to the interior 104 of the first wall 102, the exterior 106 of the first wall 102, or both. In some implementations, a porous material is connected to the third wall 302 and a porous material also is connected to the first wall 102.

Referring to FIG. 5, an electronic device 322 may be inserted in the storage device 300. The electronic device 322 may be a notebook computer. The electronic device 322 may be placed in the storage device 300 so that vents 324, if present, are facing voids 120.

As shown in FIGS. 3-5, at least one ridge 314 is present. In some implementations, the material used to create the third wall 302 has stitching 316 that forms the ridge 314. In some implementations, the at least one ridge 314 is formed by adding material to the third wall 302. In some implementations, the at least one ridge 314 is formed by removing material adjacent to where the ridge 314 is to be located. If the ridge 314 overlaps a void 120 in the first wall 102, as shown in FIG. 5, a void may be formed in the ridge 314 that substantially aligns with the vent 120.

Figure 5A:
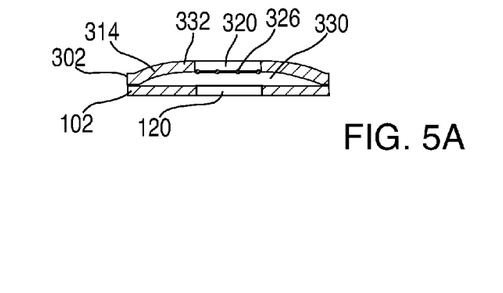
FIG. 5A is a cross-section taken along lines 5A-5A of FIG. 5.

A cross section of the ridge 314 is shown in FIG. 5A. FIG. 5A shows a cross-section taken along lines 5A-5A in FIG. 5. The ridge 314 may assist a user to grip the storage device 314. The ridge 314 may absorb impact if the storage device 300 is dropped due in part to the space 330 between the top 332 of the ridge 314 and the first wall 102. The ridge 314 may aid in the airflow through the voids 320, 120.

In some implementations, at least one ridge 314 may be located on the interior or exterior portions 304, 306, or both, of the third wall 302. In some implementations, at least one ridge 314 may be located on the interior or exterior portions 104, 106, or both, of the first wall 102. In some implementations, at least one ridge 314 may be located on both the first wall 102 and the third wall 302. In some implementations, at least one ridge 314 may be located on the interior or exterior portions 110, 112, or both, of the second wall 108.

As shown in FIGS. 3-5, the access opening 318 is closed by the mechanism 124 for closing the access opening 122, and the mechanism 124 is a zipper having two pull tabs 126. In some implementations, the zipper has only one pull tab. In some implementations having a mechanism 124 for closing the access opening 122, the mechanism 124 may be a hook-and-loop fastener, a snap, a button, a buckle, string, laces, an elastic band, a hinge, or similar mechanism for opening and closing the access opening 318.

The walls 102, 108, 302, 312 described in this application may be made of material that is substantially durable for serving the purposes described herein. Non-limiting examples of materials that may be used for the walls are nylon, cotton, canvas, polyester, microfiber, neoprene, foam, plastic, any other suitable material or blends of any of these materials. In some implementations, at least one material is a fabric or textile and the fabric or textile may be synthetic, natural, or a synthetic-natural blend. In some implementations, the walls are not all made of the same material. In some implementations, some, but not all, of the walls are made of the same material. In some implementations, all of the walls are made of the same material.

As described herein, the storage device 100, 200 has the first and second walls 102, 108 connected to each other, and the storage device 300 has the third wall 302 connected to the first wall 102 and the first wall 102 connected to the second wall 108 via sidewall 312. One of ordinary skill in the art will appreciate that there are many ways for connecting a wall to its corresponding wall within the scope and spirit of this application. As a non-limiting example, walls may be connected with stitching, heat seal, a zipper, a hook-and-loop fastener, a button, snaps, a hinge, or any other suitable mechanism for connecting the walls. In some implementations, the first and second wall 102, 108 are made of a piece of material that is folded to form the two walls and the connection between the two walls is or occurs at the fold.

The storage device described in this application is configured to receive an electronic device. The size of the storage device may depend on or correspond to the size of the electronic device to be placed in the storage device. In some implementations, the storage device may have an approximate dimension of 15 inches wide×10¾ inches high×2¼ inches deep. In some implementations, the storage device may have an approximate dimension of 15 inches wide×12 inches high×4 inches deep. In some implementations, the storage device may have an approximate dimension of 13 inches wide×10 inches high×1½ inches deep. In some implementations, the storage device may have an approximate dimension of 14 inches wide×10 inches high×1.5 inches deep. In some implementations, the storage device has an approximate dimension smaller or larger than the dimensions set forth in this paragraph.

Figure 6:
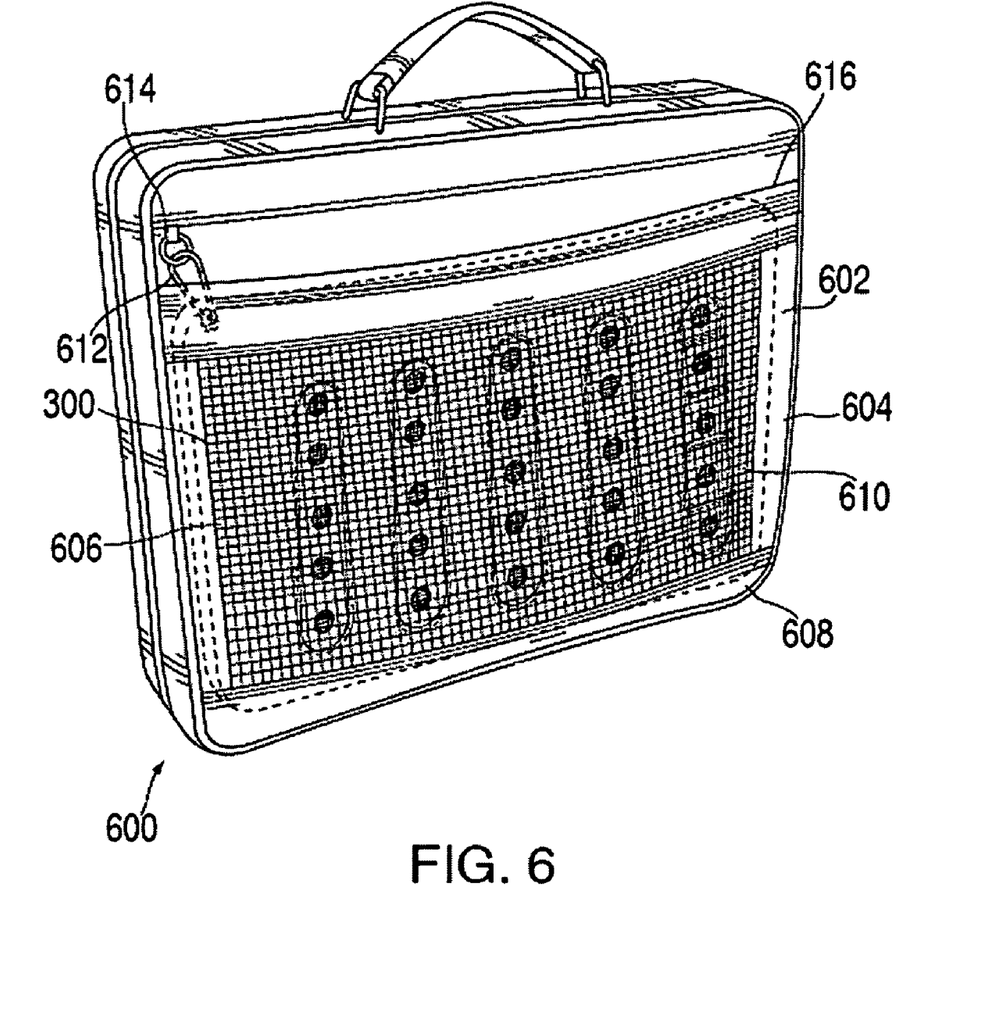
FIG. 6 is a perspective view of an exemplary briefcase that accepts an exemplary implementation of the storage device.

A bag, case, or luggage may accept the storage device. FIG. 6 shows a perspective view of an exemplary briefcase that accepts the storage device. Briefcase 600 has an external compartment 602 sized to receive a storage device as described herein. The external compartment 602 has a wall 604 that may contain a sufficient amount of porous material 606 that permits air to flow between the exterior 608 of the briefcase 600 and the interior 610 of the compartment 602. The external compartment 602 has an access opening 616 so that the storage device can be placed inside the compartment 602. In some implementations, a non-porous material is used for the wall 604 and the access opening 616 may permit air to flow between the inside of the external compartment 602 and the outside of the briefcase 600. In some implementations, a porous or non-porous material may be connected to the wall 604 by stitching, heat seal, zipper, hook-and-loop fastener, a button, or any other suitable mechanism known by one of ordinary skill in the art for connecting the material to the wall 604.

As shown, the storage device 300 is located inside the external compartment 602. The storage device 300 may have an optional mechanism 612 for securing it to the briefcase 600 or a larger compartment, bag, piece of luggage, case, or the like. In FIG. 6, the mechanism 612 is a clip that can be fastened to the briefcase 600 at 614. In some implementations, the mechanism 612 is a snap-lock mechanism, a press-fit mechanism, a bracket-type mechanism, a slide-and-lock mechanism, a twist-and-lock or other friction-fit mechanism, a tongue-and-groove mechanism, a buckle mechanism, or any other suitable mechanism for securing the storage device to the briefcase 600, larger compartment, bag, piece of luggage, case, or the like.

In some implementations, a mechanism for closing the access opening 616 of the external compartment 602 is present. The mechanism for closing the access opening 616 may be a zipper, a hook-and-loop fastener, a snap, a button, a buckle, string, laces, an elastic band, a hinge, or similar mechanism for opening and closing the access opening 616.

Figure 7:
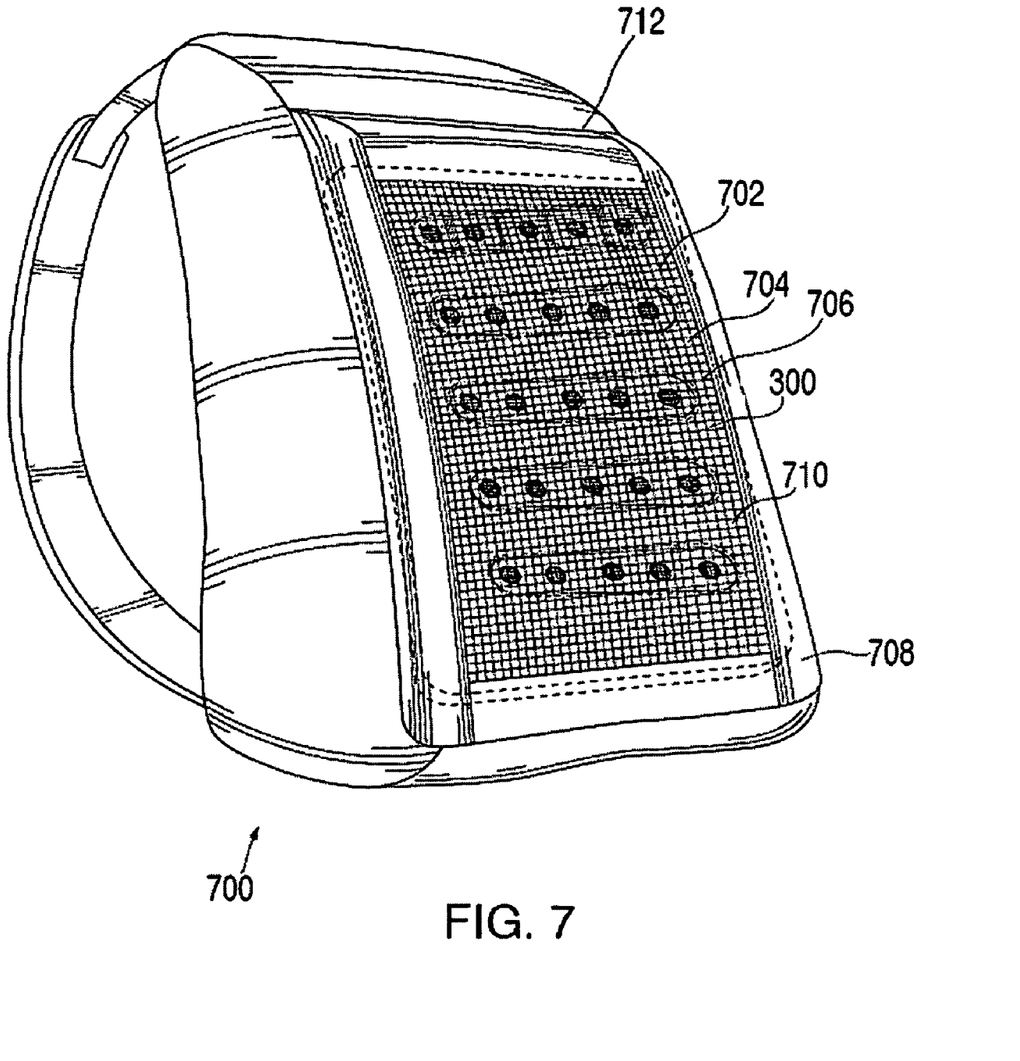
FIG. 7 is a perspective view of an exemplary backpack that accepts an exemplary implementation of the storage device.

FIG. 7 is a perspective view of an exemplary backpack that accepts the storage device. Backpack 700 has an external compartment 702 sized to receive a storage device as described herein. The external compartment 702 has a wall 704 that contains a sufficient amount of porous material 706 that permits air to flow between the exterior 708 of the backpack 700 and the interior 710 of the compartment 702. The external compartment 702 has an access opening 712 so that the storage device can be placed inside the compartment 702. In some implementations, a non-porous material is used for the wall 704 and the access opening 712 may permit air to flow between the inside of the external compartment 702 and the outside of the backpack 700. In some implementations, a porous or non-porous material may be connected to the wall 704 by stitching, heat seal, zipper, hook-and-loop fastener, a button, or any other suitable mechanism known by one of ordinary skill in the art for connecting the material to the wall 704.

As shown, storage device 300 is located inside the external compartment 702. In some implementations, a mechanism for closing the access opening 712 is present. The mechanism for closing the access opening 712 may be a zipper, a hook-and-loop fastener, a snap, a button, a buckle, string, laces, an elastic band, a hinge, or similar mechanism for opening and closing the access opening 712.

A number of implementations have been described. Nevertheless, it will be understood that various modifications may be made without departing from the spirit and scope of the disclosures in this application. As a non-limiting example, additional components may be added to those described above, or components may be removed or rearranged. As another non-limiting example, a mechanism for securing the storage device 100, 200 may be present so that the storage device 100, 200 may be secured to or placed in and secured to a larger compartment, briefcase, bag, piece of luggage, case, or the like. The mechanism for securing the storage device 100, 200 may be a clip, buckle, a hook-and-loop fastener, a snap-lock mechanism, a press-fit mechanism, a bracket-type mechanism, a slide-and-lock mechanism, a twist-and-lock or other friction-fit mechanism, a tongue-and-groove mechanism, or any other suitable mechanism for securing the storage device 100, 200 to a larger compartment, bag, piece of luggage, case, or the like. As another non-limiting example, the access opening 122, 318, 616, 712 may be located at a position different from what is depicted in the figures. In some implementations, the access opening may be located at the bottom of the storage device, briefcase, or backpack. In some implementations, the access opening may be located at a side of the storage device, briefcase, or backpack. As another non-limiting example, although FIGS. 6 and 7 show an exemplary briefcase and backpack, respectively, which accept the storage device, other shaped or kinds of bags, cases, or luggage may accept the storage device.

Also, although the voids 120, 320 are shown as circles in the figures, the voids 120, 320 are not limited to circles. The shape of the voids 120, 320 may be circular, oval, square, rectangular, trapezoidal or any other shape or combination of shapes. In addition, in some implementations, instead of being connected to substantially most of a wall such as the porous materials 102 and 326 shown in FIGS. 2 and 4, respectively, the porous material may be located at locations corresponding to the voids or along a smaller percentage of the wall to which it is attached compared to that shown in FIGS. 2 and 4.

Other implementations are within the scope of the following claims.

What is claimed is:

1. A storage device configured to receive an electronic device comprising:
    a first wall having an interior and exterior portion;
    a second wall having an interior and exterior portion, the second wall opposing and connected to the first wall so that the interior portions of the first and second walls define an interior of the storage device and the exterior portions of the first and second walls define an exterior of the storage device;
    an access opening located between the first and second walls, the access opening sized to receive the electronic device;
    a plurality of voids located in the first wall configured to permit air passage between the interior and exterior of the storage device;
    a porous material connected to the first wall, wherein the porous material permits airflow through the voids;
    at least one ridge located on the first wall, wherein the ridge is configured to aid in the air passage through at least one of the plurality of voids; and
    a third wall having an interior and exterior portion and voids, the third wall opposing and connected to the first wall so that the interior of the third wall and the exterior of the first wall define an interior of a compartment, and the voids in the third wall substantially align with the voids in the first wall.

2. The storage device of claim 1, further comprising a mechanism for closing the access opening.

3. The storage device of claim 2, wherein the mechanism for closing the access opening comprises at least one item selected from the group consisting of a zipper, a hook-and-loop fastener, a snap, a button, a buckle, string, laces, an elastic band, and a hinge.

4. The storage device of claim 1, wherein the first and second walls are connected via a sidewall.

5. The storage device of claim 1, further comprising an access opening located between the first and third walls.

6. The storage device of claim 1, wherein the porous material comprises mesh.

7. The storage device of claim 1, wherein the voids are approximately 3 millimeters in size.

8. The storage device of claim 1, wherein the voids are approximately 40 millimeters in size.

9. The storage device of claim 1, wherein approximately 13%-16% of the first wall contains voids.

10. The storage device of claim 1, wherein approximately 40%-49% of the first wall contains voids.

11. A storage device configured to receive an electronic device comprising:
    a first wall having an interior and exterior portion;
    a second wall having an interior and exterior portion, the second wall opposing and connected to the first wall so that the interior portions of the first and second walls define an interior of the storage device and the exterior portions of the first and second walls define an exterior of the storage device;
    an access opening located between the first and second walls, the access opening sized to receive the electronic device;
    a plurality of voids located in the first wall configured to permit air passage between the interior and exterior of the storage device;
    a third wall having an interior and exterior portion, voids and at least one ridge, the third wall opposing and connected to the first wall so that the interior of the third wall and the exterior of the first wall define an interior of a compartment, the voids in the third wall substantially align with the voids in the first wall, and the ridge is configured to aid in the air passage through at least one of the plurality of voids; and a porous material connected to the third wall, wherein the porous material permits airflow through the voids in the third wall.

12. The storage device of claim 11, further comprising a mechanism for closing the access opening.

13. The storage device of claim 12, wherein the mechanism for closing the access opening comprises at least one item selected from the group consisting of a zipper, a hook-and-loop fastener, a snap, a button, a buckle, string, laces, an elastic band, and a hinge.

14. The storage device of claim 11, wherein the first and second walls are connected via a sidewall.

15. The storage device of claim 11, further comprising a porous material connected to the first wall, wherein the porous material permits airflow through the voids in the first wall.

16. The storage device of claim 11, further comprising an access opening located between the first and third walls.

17. The storage device of claim 11, wherein the voids are approximately 3 millimeters in size.

18. The storage device of claim 11, wherein the voids are approximately 40 millimeters in size.

19. The storage device of claim 11, wherein approximately 13%-16% of the first wall contains voids.

20. The storage device of claim 11, wherein approximately 40%-49% of the first wall contains voids.

* * * * *